(12) United States Patent
Reenders et al.

(10) Patent No.: US 11,654,517 B2
(45) Date of Patent: May 23, 2023

(54) FASTENER WELDING APPARATUS

(71) Applicant: JR Automation Technologies, LLC, Holland, MI (US)

(72) Inventors: Seth Reenders, Grand Haven, MI (US); Heath Lynnes, Muskegon, MI (US); Robb Ripley, Holland, MI (US)

(73) Assignee: JR Automation Technologies, LLC, Holland, MI (US)

( * ) Notice: Subject to any disclaimer, the term of this patent is extended or adjusted under 35 U.S.C. 154(b) by 821 days.

(21) Appl. No.: 16/567,617

(22) Filed: Sep. 11, 2019

(65) Prior Publication Data

US 2020/0230751 A1 Jul. 23, 2020

Related U.S. Application Data

(60) Provisional application No. 62/729,744, filed on Sep. 11, 2018.

(51) Int. Cl.
*B23K 37/02* (2006.01)
*B23K 11/00* (2006.01)
*B23K 11/30* (2006.01)
*B23K 11/36* (2006.01)

(52) U.S. Cl.
CPC ........ *B23K 37/0211* (2013.01); *B23K 11/002* (2013.01); *B23K 11/30* (2013.01); *B23K 11/36* (2013.01); *B23K 37/0241* (2013.01)

(58) Field of Classification Search
CPC ..... B23K 11/002; B23K 11/30; B23K 11/315; B23K 11/36; B23K 37/0211; B23K 37/0241

USPC ........................................................ 219/119
See application file for complete search history.

(56) References Cited

U.S. PATENT DOCUMENTS

| | | | |
|---|---|---|---|
| 1,817,193 | A | 8/1931 | Hughes |
| 1,869,804 | A | 8/1932 | Eksergian |
| 2,048,682 | A | 7/1936 | Borgadt |
| 2,344,875 | A | 3/1944 | James |
| 2,474,340 | A | 6/1949 | Warner |
| 2,851,994 | A | 9/1958 | Fagge |
| 3,095,501 | A | 6/1963 | Goekler |
| 3,325,625 | A | 6/1967 | Ogden |
| 3,469,067 | A | 9/1969 | Ogden |

(Continued)

FOREIGN PATENT DOCUMENTS

| | | |
|---|---|---|
| CN | 2129197 Y | 4/1993 |
| CN | 2258803 Y | 8/1997 |

(Continued)

*Primary Examiner* — Dana Ross
*Assistant Examiner* — Joseph W Iskra
(74) *Attorney, Agent, or Firm* — The Watson IP Group, PLC; Jovan N. Jovanovic

(57) ABSTRACT

A fastener welding apparatus having a frame assembly, a welding assembly, a coupling assembly and a locating assembly. The welding assembly has a welder frame and a welding electrode assembly coupled thereto. The coupling assembly has a suspension frame, a frame axle and a welding axle. The frame axle is fixedly engaged to the frame assembly and the welding axle is fixedly engaged to the welding assembly. The suspension frame is pivotably coupled to each of the frame axle and the welding axle. The locating assembly is structurally configured to selectively allow the suspension frame to pivot relative to the frame axle and the welding axle.

16 Claims, 14 Drawing Sheets

(56) References Cited

U.S. PATENT DOCUMENTS

| | | | |
|---|---|---|---|
| 3,634,644 | A | 1/1972 | Ogden |
| 4,754,116 | A | 6/1988 | Naruse et al. |
| 4,929,146 | A | 5/1990 | Koster et al. |
| 5,416,288 | A | 5/1995 | Widmer |
| 5,530,218 | A * | 6/1996 | Nakamura ............ B23K 11/314 219/86.25 |
| RE36,541 | E | 2/2000 | Rossi |
| 6,163,004 | A | 12/2000 | Aoyama et al. |
| 6,337,456 | B1 | 1/2002 | Taniguchi et al. |
| 6,481,560 | B2 | 11/2002 | Kearney |
| 6,720,517 | B2 | 4/2004 | Kato et al. |
| 6,875,946 | B2 | 4/2005 | Hidaka |
| 8,294,064 | B1 | 10/2012 | Raiche et al. |
| 9,172,290 | B2 | 10/2015 | Muth et al. |
| 9,434,020 | B2 | 9/2016 | Nakakura et al. |
| 9,895,775 | B2 | 2/2018 | Koscielski et al. |
| 10,471,549 | B2 * | 11/2019 | Koscielski ............ B23K 11/115 |
| 2010/0108466 | A1 | 5/2010 | Herzog |
| 2012/0318637 | A1 | 8/2012 | Ito |
| 2016/0354872 | A1 | 12/2016 | Koscielski et al. |
| 2017/0221744 | A1 | 8/2017 | Peinovich et al. |

FOREIGN PATENT DOCUMENTS

| | | | |
|---|---|---|---|
| CN | 2829963 Y | 8/1997 | |
| CN | 101670480 A | 3/2010 | |
| CN | 101972888 A | 2/2011 | |
| CN | 102079007 A | 6/2011 | |
| CN | 102489856 B | 6/2012 | |
| EP | 815980 * | 1/1998 | |
| EP | 0830916 B1 | 12/2001 | |
| FR | 2750063 A1 * | 12/1997 | ........... B21D 39/031 |
| GB | 744824 A | 2/1956 | |
| JP | H0292469 A | 4/1990 | |
| KR | 20060059533 A | 6/2006 | |
| KR | 100916149 B1 | 9/2009 | |
| WO | 2008110635 A1 | 9/2008 | |
| WO | 2016000077 A1 | 1/2016 | |

* cited by examiner

FASTENER WELDING APPARATUS

CROSS-REFERENCE TO RELATED APPLICATION

This application claims priority from U.S. patent application Ser. No. 62/729,744 entitled "Fastener Welding Apparatus" filed Sep. 11, 2018, the entire disclosure of which is hereby incorporated by reference in its entirety.

BACKGROUND OF THE DISCLOSURE

1. Field of the Disclosure

The disclosure relates in general to a welding apparatus, and more particularly, to a fastener welding apparatus. The welding apparatus allows for movement of the welding electrodes within a certain range to adaptively move to the desired position for welding a fastener, wherein the desired position may be within a range of acceptable positions.

2. Background Art

The welding of fasteners is well known in the art. Typically, a user will position a fastener within welding equipment, and then position a part in the desired position within the welding equipment. The welder then activates, and electrodes couple the parts together. With increased automation, it is desirable to have the welding processes executed by robotic arms and the like, with minimal involvement by operators.

Additionally, it is desirable to be able to have a single welder and single robot arm capable of grabbing different parts which may be unrelated. Furthermore, it is desirable to have the different parts be positioned and grasped by the robotic arms in orientations that are less than exact orientations.

Problematically, it is difficult to properly weld a fastener to a part in instances wherein the part is not exactly perfectly positioned. Yet, to achieve the versatility and the speed of assembly operations, it is desirable to have less than exact orientations of the parts.

To solve such problems, welders have been developed that have floating heads and the like. Among other solutions, welders are positioned on a platform that is movable with a desired range relative to the frame. Thus, the welder can adjust within a certain limit of adjustment (i.e., +/−4 to 6 mm).

While such welders have achieved some success, due to the forces exerted by the welders on the part, as well as the weight of the welders, such movable platforms have not performed as well as can be expected. In some instances, such movable platforms can exhibit difficulty in movement, can be limited or precluded from movement, or can move or react to the different forces in undesirable manners. Additionally, performance of the re-centering mechanisms has been less than successful.

SUMMARY OF THE DISCLOSURE

The disclosure is directed a fastener welding apparatus comprising a frame assembly, a welding assembly, a coupling assembly and a locating assembly. The welding assembly has a welder frame and a welding electrode assembly coupled thereto. The coupling assembly has a suspension frame, a frame axle and a welding axle. The frame axle is fixedly engaged to the frame assembly and the welding axle is fixedly engaged to the welding assembly. The suspension frame is pivotably coupled to each of the frame axle and the welding axle. The locating assembly is structurally configured to selectively allow the suspension frame to pivot relative to the frame axle and the welding axle.

It will be understood that the locating assembly is configured to selectively allow the movement of the welding assembly and the frame assembly within a range of movement, achieved through the pivoting of the suspension frame of the coupling assembly about the frame axle and the welding axle. This allows for the welding of a fastener to a part to occur within the welding apparatus at a range of positions of the part within the welding apparatus. That is, as long as a part is positioned with a predetermined range of positions, the welding apparatus is capable of properly welding the fastener to the part. Additionally, the robustness of the coupling assembly, allows for small forces to move and properly position the welding assembly in preparation of the welding process.

In some configurations, the welding electrode assembly comprises an upper electrode and a lower electrode, defining an electrode axis. The frame axle and the welding axle are parallel to each other and parallel to the electrode axis.

In some configurations, the electrode axis is spaced apart from the welding axle.

In some configurations, the suspension frame includes a frame coupling region and a welding coupling region spaced apart from the frame coupling region. Additionally, the frame axle is positioned proximate the frame coupling region and the welding axle is positioned proximate the welding coupling region.

In some configurations, the suspension frame further includes a counterweight coupling region on a side opposite the welding coupling region with the frame coupling region being positioned therebetween.

In some configurations, fastener welding apparatus further comprises at least one counterweight attached to the suspension frame proximate the counterweight coupling region.

In some configurations, the locating assembly further comprises a first mating structure coupled to the welder frame and a second mating structure coupled to the frame assembly. An actuator is coupled to one of the first mating structure and the second mating structure. The actuator is configured to direct the mating structures between a first position and a second position, wherein, in the first position, relative movement of the welding frame relative to the frame assembly about is precluded.

In some configurations, in the second position, relative movement of the welding frame relative to the frame assembly through the coupling assembly is facilitated.

In some configurations, in the second position, the locating assembly defines a range of movement of the welding frame relative to the frame assembly.

In some configurations, the first mating structure comprises a generally circular opening that is fixed to the welder frame, and the second mating structure comprises a pin member.

In some configurations, the pin member has a frustoconical configuration, wherein an upper portion of the pin member has a diameter that is smaller than the opening defining the first mating structure and a lower portion of the pin member has a diameter that substantially matches the diameter of the first mating structure.

In some configurations, the actuator is coupled to the second mating structure.

In some configurations, the welding frame is coupled to an upper end of the welding axle and fixed thereto.

In some configurations, the welding frame further includes a lower cross plate coupled to the welding axle, and a pair of spaced apart c-shaped side surfaces coupled to the welding frame. The side surfaces define a lower extension and an upper extension, with an upper electrode coupled to the upper extension and a lower electrode coupled to the lower extension.

In another aspect of the disclosure, the disclosure is directed to a method for welding a fastener. The method, broadly, comprises the steps of: directing a part into a welding apparatus; directing a fastener into a welding apparatus; coupling a welding electrode assembly to a frame assembly through a coupling assembly, with the coupling assembly allowing for selective movement of the welding electrode assembly relative to the frame assembly; allowing the coupling assembly to move relative to the welding electrode assembly; moving the welding electrode assembly into the desired orientation relative to the part; welding the fastener to the part; removing the part; and precluding the coupling assembly to move relative to the welding electrode assembly.

In some configurations, a locating assembly comprises a first mating structure on the welding assembly and a second mating structure on the frame assembly. The second mating structure is capable of moving relative to the first mating structure to place the two in a first position and a second position. In the first position, relative movement of the frame assembly and the welding assembly is precluded, whereas in a second position, relative movement of the frame assembly and the welding assembly is permitted through a desired range of pivoting of the suspension frame about the frame axle and the welding axle. Additionally, by directing the first and second mating structures from the second position to the first position, returns the frame assembly and the welding assembly into, preferably, a centered orientation.

BRIEF DESCRIPTION OF THE DRAWINGS

The disclosure will now be described with reference to the drawings wherein.

DETAILED DESCRIPTION OF THE DISCLOSURE

Figure 1:
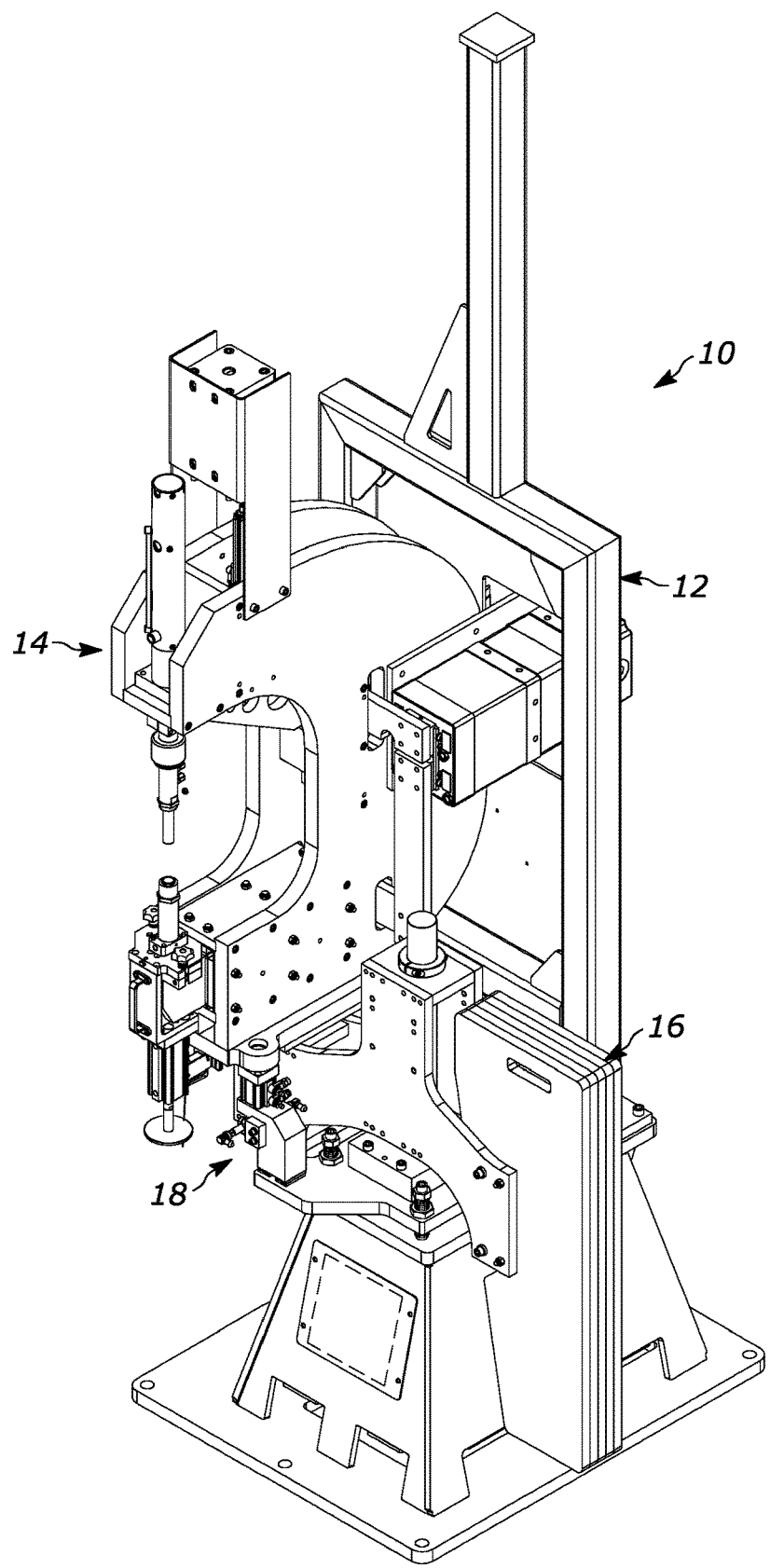
FIG. 1 of the drawings is a first side perspective view of a fastener welding apparatus of the present disclosure, showing, in particular, a configuration thereof for fastening studs or threaded bolts.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
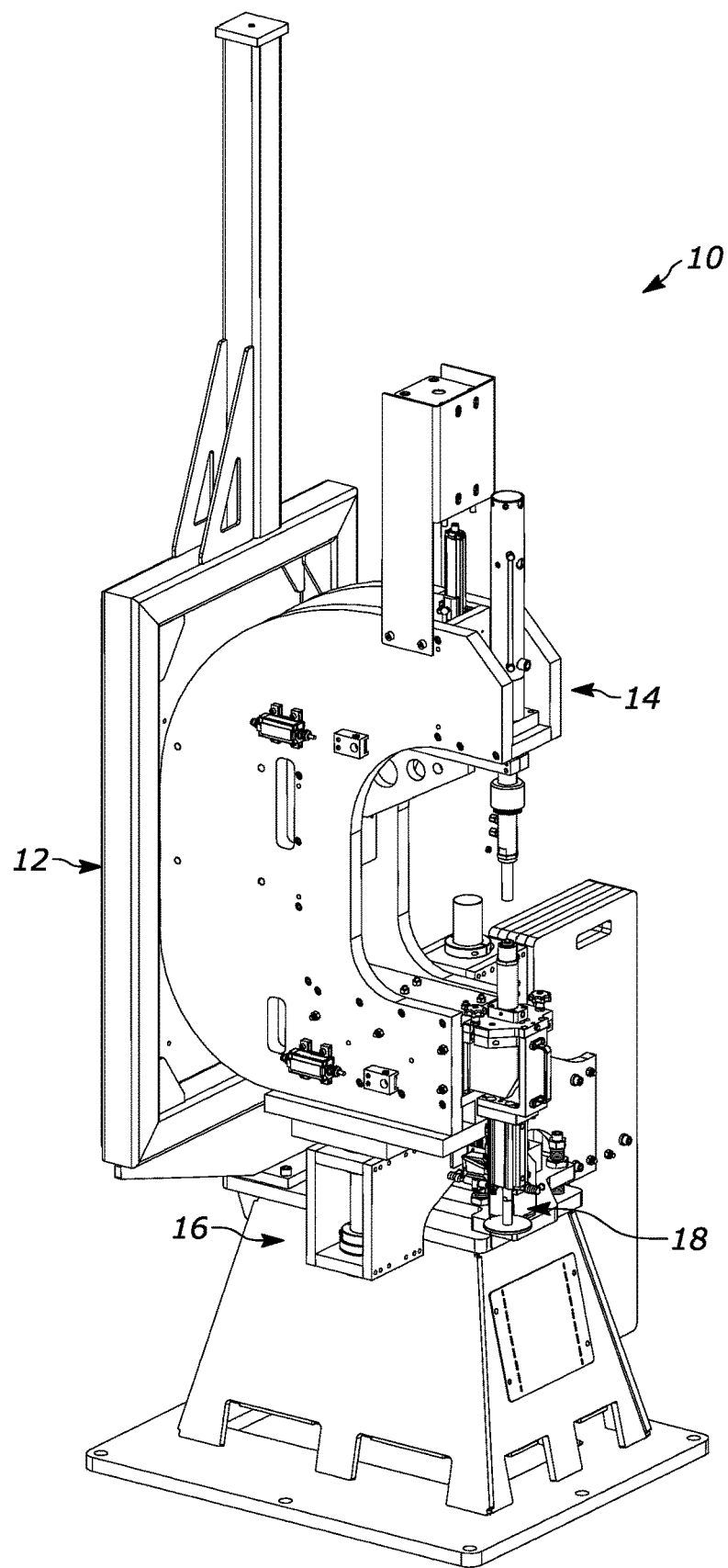
FIG. 2 of the drawings is a second side perspective view of a fastener welding apparatus of the present disclosure shown in FIG. 1.

Referring now to the drawings and in particular to FIGS. 1 and 2, the fastener welding apparatus is shown generally at 10. The fastener welding apparatus can be configured for use in association with a robotic arm (shown in the photographs) that can grasp and retain parts to which fasteners can be coupled. Typically, such fasteners include, but are not limited to, threaded bolts and threaded nuts. In other configurations, the fasteners may include rivets as well as unthreaded post members and the like. It will be understood that the arm will grasp, retain and position parts within a certain range of acceptable positions. As such, the precise location on the part where the welding of the fastener is to occur may vary from part to part, due to the robot arm position, and the position on the part which was grasped by the robot arm. The apparatus is configured to allow for such variability and to nevertheless precisely position and weld the fastener in the proper position.

The fastener welding apparatus is shown, in one configuration, as having a frame assembly 12, a welding assembly 14, a coupling assembly 16 and a locating assembly 18. The configuration shown in FIGS. 1 through 10 is a first configuration, suitable for the welding of studs and threaded bolts and the like. The configuration shown in FIGS. 11 through 14 is a second configuration, suitable for the welding of nuts and the like. It will be understood that variations may be made to each within the scope of the present disclosure, and principles may be adopted from either one of the configurations shown.

Figure 3:
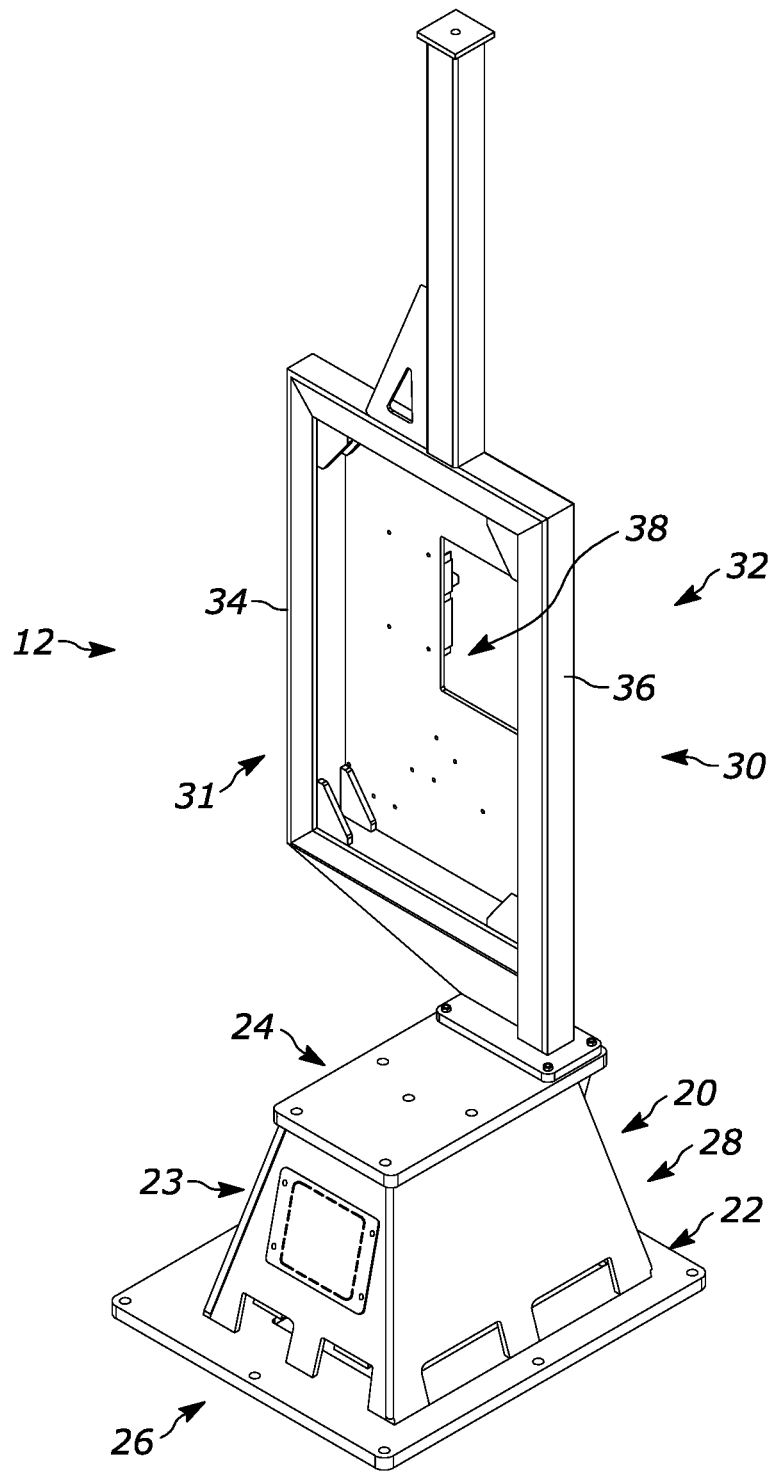
FIG. 3 of the drawings is a first side perspective view of the frame assembly of the fastener welding apparatus of the present disclosure, showing, in particular, the lower base portion and the upper frame portion coupled together.

With reference to FIG. 3, the frame assembly includes a lower base portion 20 and an upper frame portion 30. The lower base portion includes foot member 22 and platform 24 spaced apart from the foot member by way of a structure 23. The lower base portion defines a front 26 and a back 28. In the configuration shown, the foot member and the platform are generally parallel to each other and are spaced apart so as to elevate the platform. As will be explained, the welding assembly is coupled to the frame assembly through the coupling assembly. As such, it will be understood that the platform has the capacity to support the weight of the frame assembly and the welding assembly.

The upper frame portion 30 extends from the lower base portion in a generally upward direction. The upper frame portion defines a front 31 and a back 32, as well as a first side 34 and a second side 36. An opening 38 is defined through the upper frame portion. In the configuration shown, the frame generally comprises a generally rectangular structure formed from beam members, with a sheet metal structure spanning therebetween. The opening extends through the sheet metal structure. In many configurations, various electrical and pneumatic structures are routed through or suspended by the upper frame portion. Additionally, the upper frame structure provides a reinforcement and protection to the components.

Figure 4:
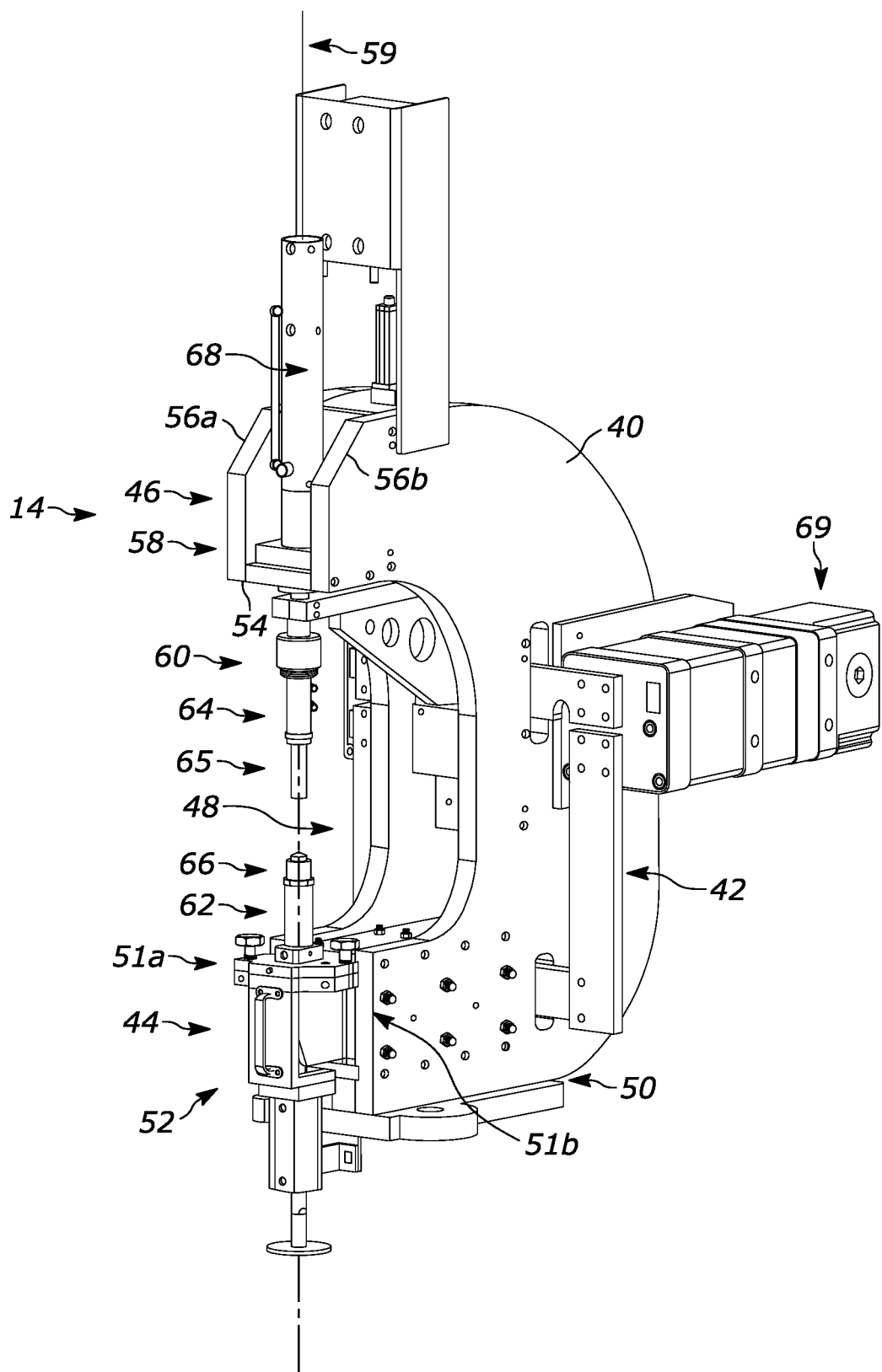
FIG. 4 of the drawings is a first side perspective view of the welding assembly of the fastener welding apparatus of the present disclosure, showing, in particular, the welder frame, the welding electrode assembly and the power and control system.
Figure 5:
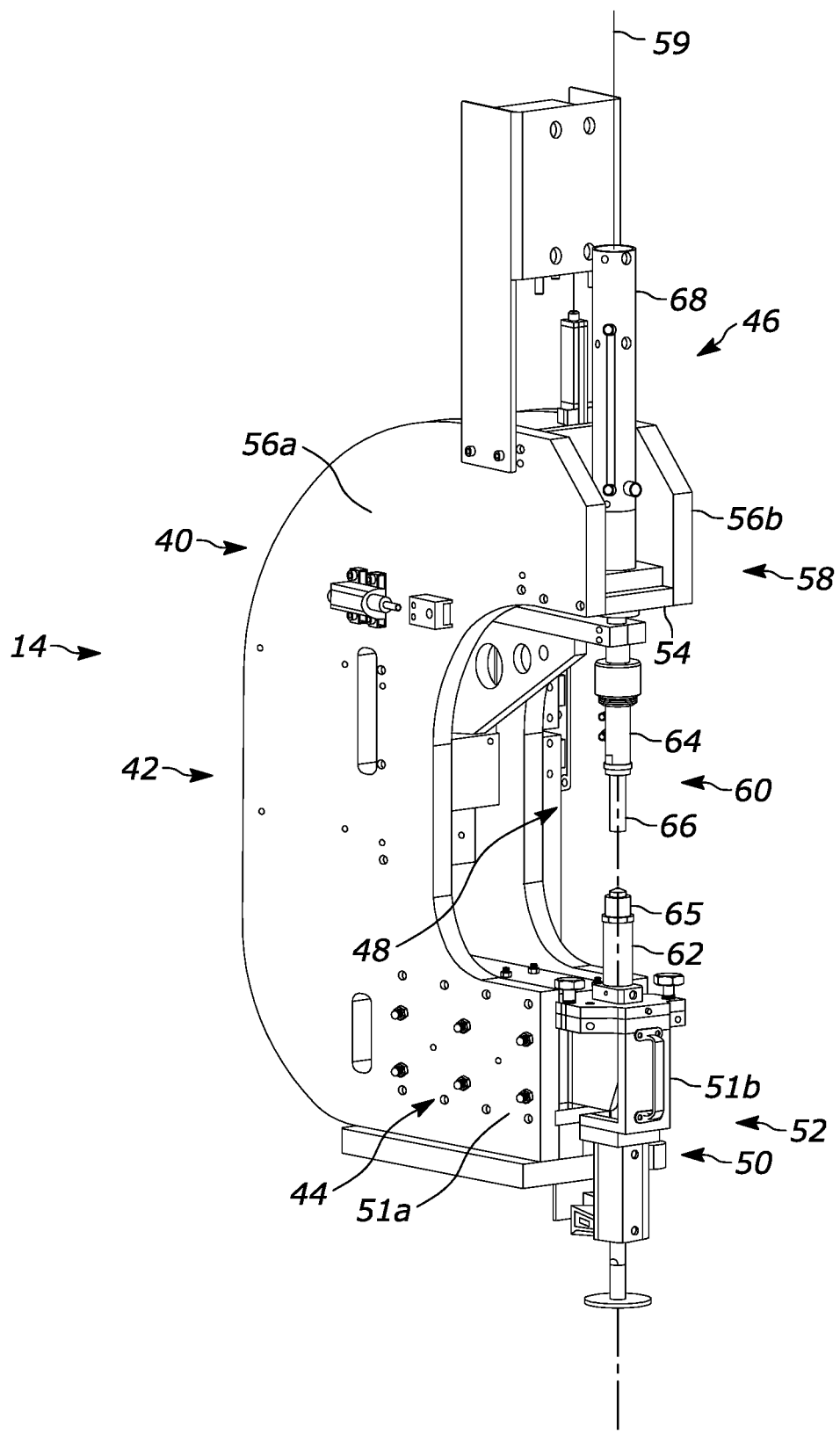
FIG. 5 of the drawings is a second side perspective view of the welding assembly of the fastener welding apparatus of the present disclosure.
Figure 6:
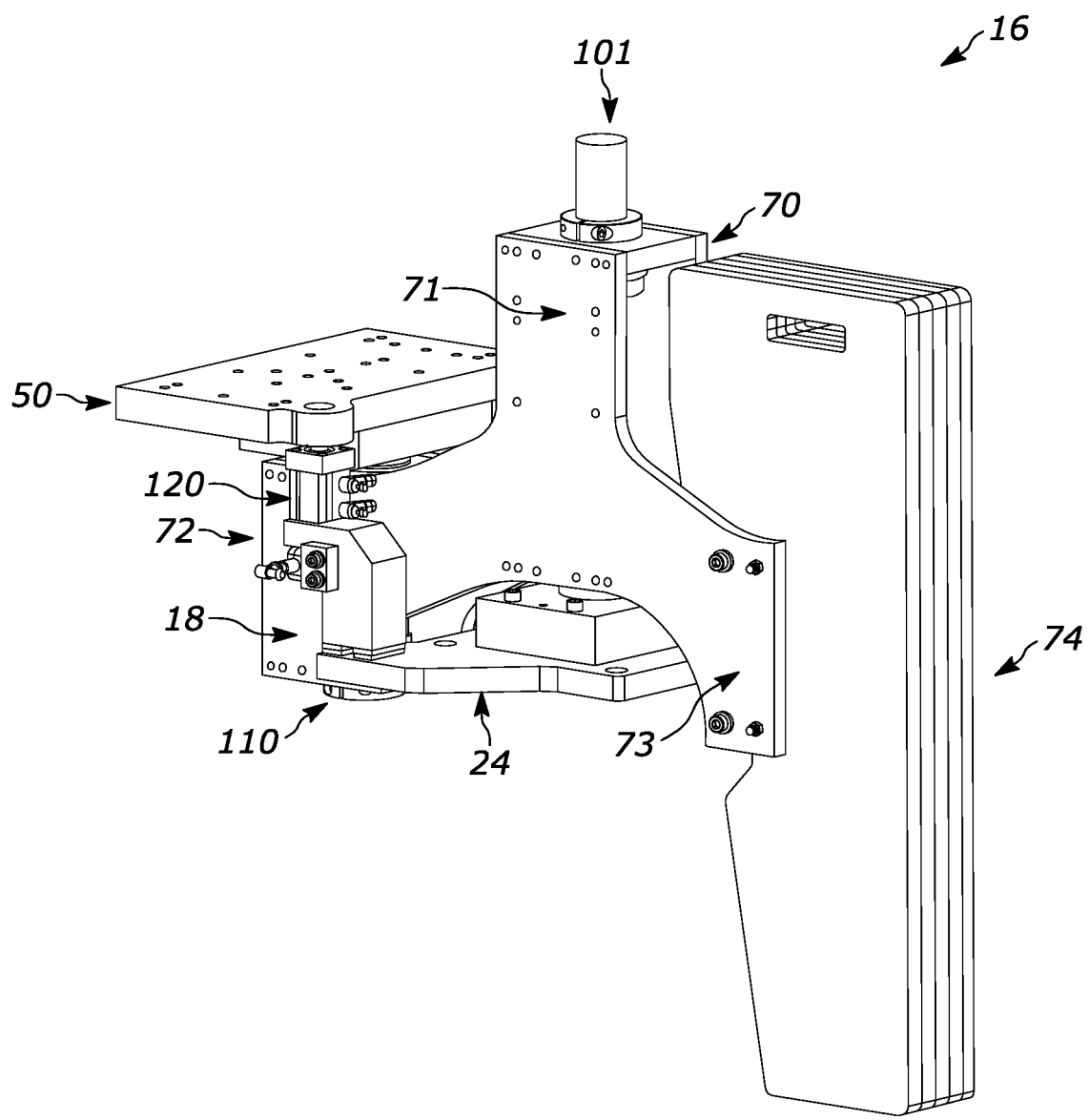
FIG. 6 of the drawings is a first side perspective view of the coupling assembly of the fastener welding apparatus of the present disclosure, showing, a configuration thereof having a counterweight coupling region and a plurality of counterweights coupled thereto, and also showing the locating assembly, and the interaction thereof with the frame assembly and the welder frame.
Figure 7:
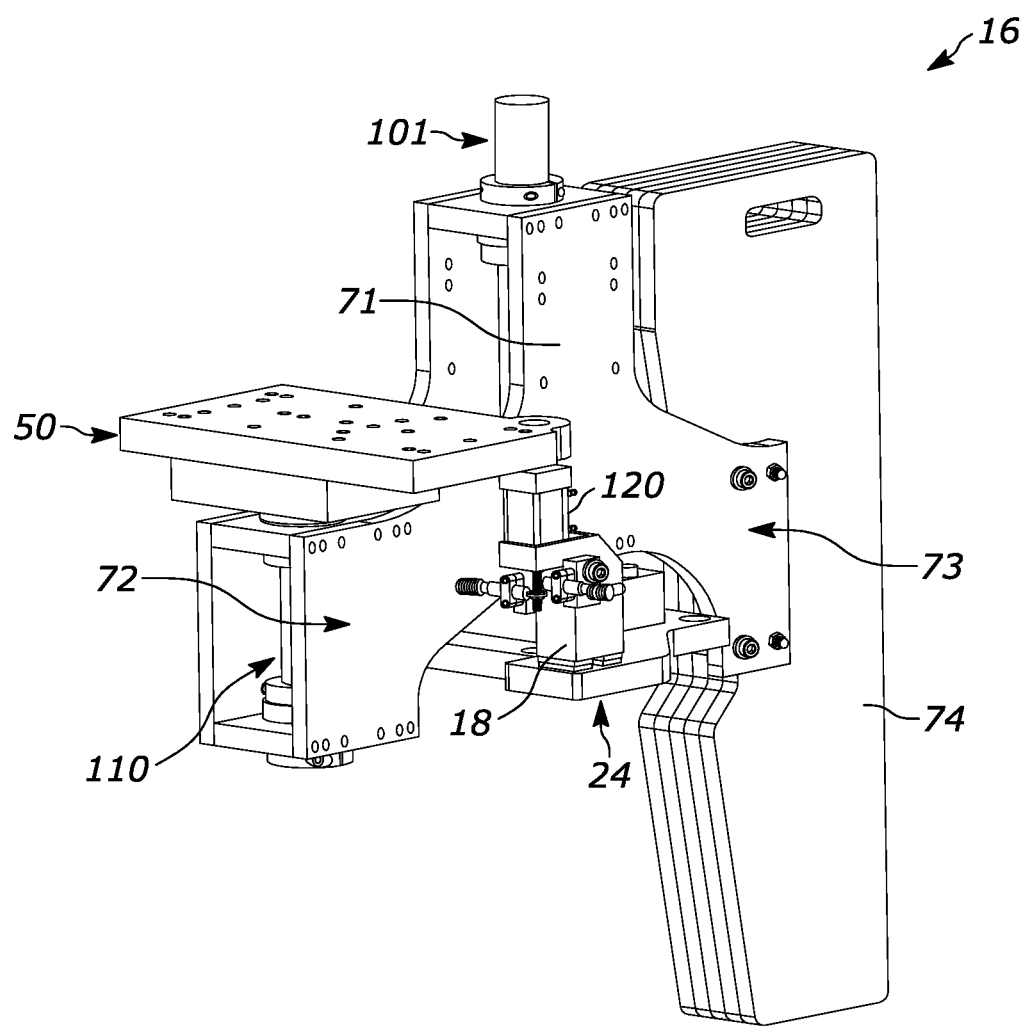
FIG. 7 of the drawings is a second side perspective view of the coupling assembly of the fastener welding apparatus of the present disclosure, showing, a configuration thereof having a counterweight coupling region and a plurality of counterweights coupled thereto, and also showing the locating assembly, and the interaction thereof with the frame assembly and the welder frame.
Figure 8:
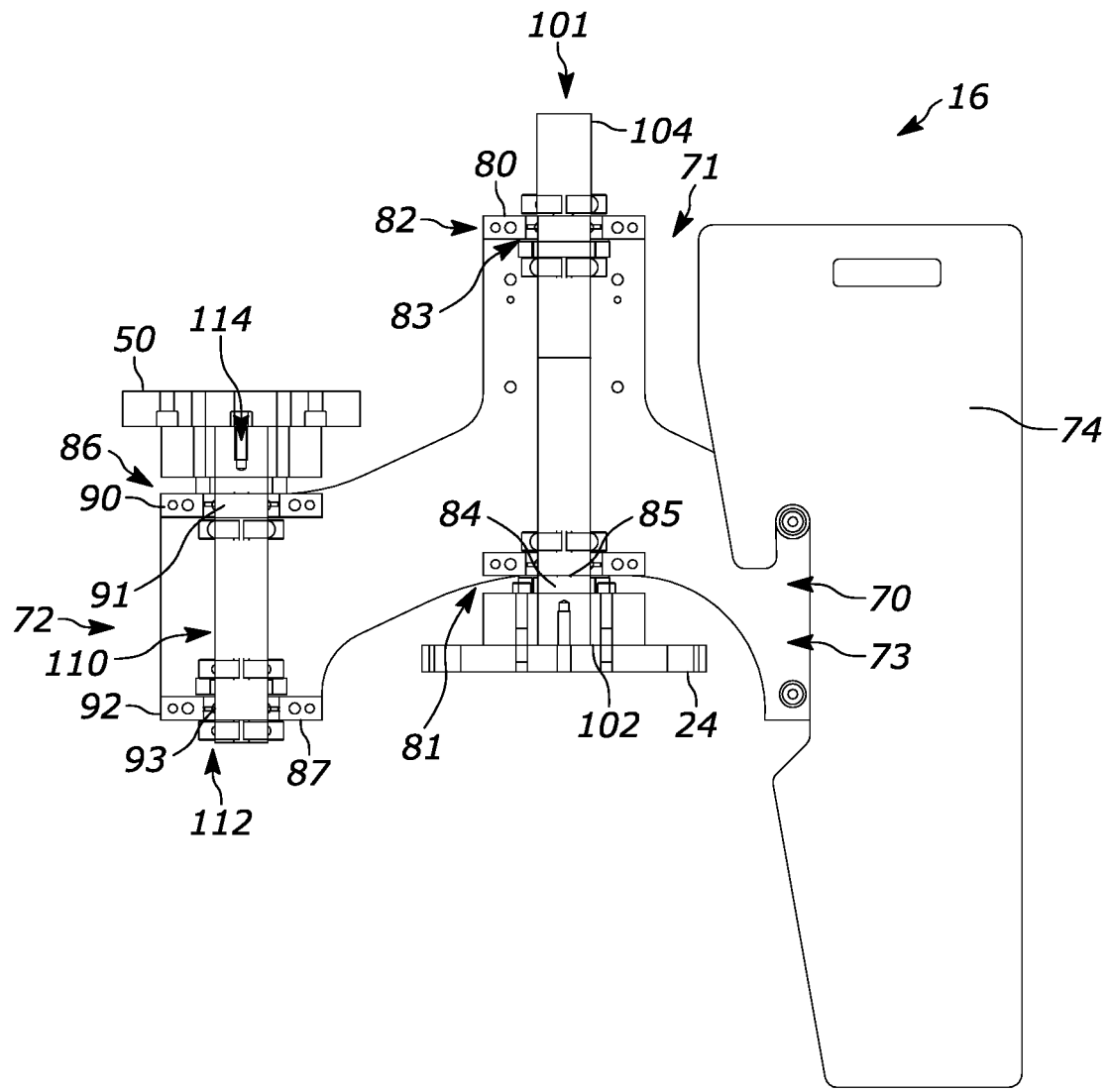
FIG. 8 of the drawings is a cross-sectional view of the coupling assembly of the fastener welding apparatus of the present disclosure, showing, in particular, the suspension frame, and the interaction thereof with the frame axle and the welding axle, as well as the coupling thereof to the frame assembly and the welder frame.

With reference to FIGS. 4 and 5 (collectively with FIGS. 1 and 2, as overview), the welding assembly 14 is shown as comprising welder frame 40, welding electrode 60 and the associated power and control systems identified generally as 69. The welder frame 40, in the configuration shown, has a C-shaped configuration formed by two spaced apart plates that together define a central workspace 48. It will be understood that the central workspace is configured to receive the part so that the part can be positioned appropriately relative to the electrodes.

The lower extension 44 includes lower cross plate 50, and side surface regions 51a, 51b that are a part of the C-shaped configuration. The lower extension extends out to a distal end 52. Similarly, the upper extension 46 includes upper cross plate 54, with side surface regions 56a, 56b which are a part of the C-shaped configuration. The upper extension extends out to a distal end 58. The distal ends correspond to each other such that an electrode axis 59 is defined therebetween. In the configuration shown, the electrode axis 59 is substantially vertical, with the C-shaped configuration likewise being substantially vertically oriented. It will be understood that it is contemplated that the electrode axis may be disposed at an angle that is oblique or perpendicular to the substantially vertical orientation shown. It will be understood that the welder frame maintains the electrodes in the proper orientation during the welding operation, despite the large compressive forces associated therewith.

The welding electrode assembly 60 is shown as comprising lower electrode 62, upper electrode 64, fastener positioning assembly 65, electrode reference assembly 66 and actuator assembly 68. In the configuration shown, the upper electrode is associated with the upper extension 46 with the lower electrode associated with the lower extension 44, with the two spaced apart from each other. Typically, the fastener is positioned loosely coupled or associated with one of the electrodes by way of the fastener positioning assembly 65. Generally, and as will be understood to those of skill in the art, the fastener is generally received in a structure which precludes disengagement of the fastener, but which allows for some movement thereof relative to the electrode.

Figure 11:
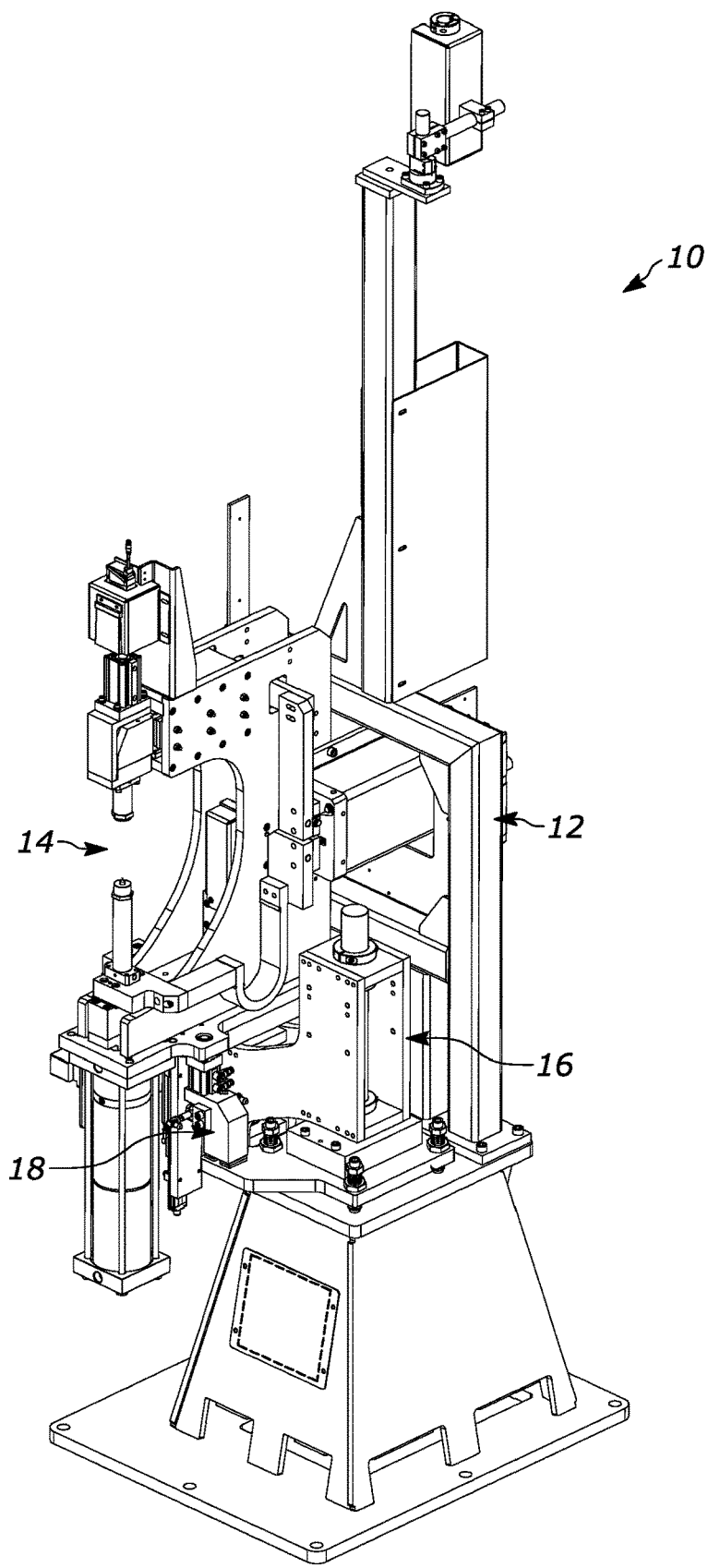
FIG. 11 of the drawings is a first side perspective view of another configuration of the fastener welding assembly of the present disclosure, with the configuration shown having similar principles and operation, and configured for the welding of threaded nuts and the like, and with the understanding that the configuration is again merely exemplary of the principles of the present disclosure.
Figure 12:
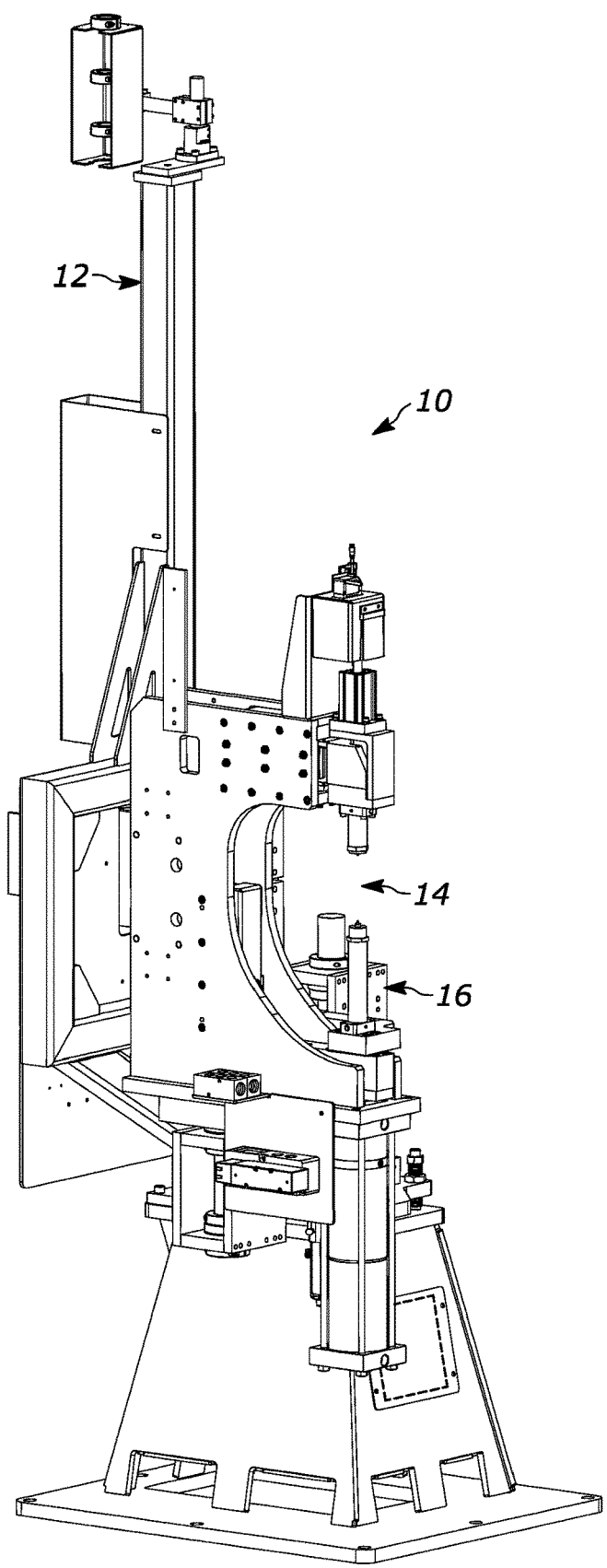
FIG. 12 of the drawings is a second side perspective view of the fastener welding assembly of FIG. 11.

Typically, one of the two electrodes is stationary (in the configuration of FIG. 1, the lower electrode is stationary, with the upper electrode being vertically movable through the actuator assembly 68 (which may comprise a pneumatic or hydraulic cylinder or the like), whereas un the configuration of FIG. 11, the upper electrode is stationary). The vertically movable electrode generally includes an electrode reference assembly (which may comprise a probe or the like) to determine if the part is in an orientation which is within the allowable variation. For example, in some configurations, if the part is not within the allowable variation, then the process will be aborted and the part removed, readjusted, or the system will request operator intervention.

It will be understood that a number of different configurations are contemplated for the upper and lower electrode, as well as the positioning assembly, the electrode reference assembly and the actuator assembly. Those of skill in the art will recognize that a number of different manufacturers and suppliers are available for such components. Similarly, a number of different manufacturers exist for the power and control system components that control the movement and energization of the electrodes and the other components.

The coupling assembly 16 is shown in FIGS. 6 through 9 as comprising suspension frame 70, frame axle 101 and welding axle 110. The suspension frame 70 comprises a pair of spaced apart plates that are coupled together in a spaced apart configuration. The suspension frame defines a frame coupling region 71 and a welding coupling region 72. The frame coupling region is defined by a first axle coupling 80 and a second axle coupling 81. The first axle coupling comprises a plate 82 defining an opening 83, and the second axle coupling comprises a plate 84 defining an opening 85. The two openings 83, 85 are spaced apart from each other and co-axial. Similarly, the first axle coupling 86 comprises a plate 90 and opening 91. The second axle coupling 87 comprises a plate 92 and opening 93. The two openings 91, 93 are co-axial. In the configuration shown, the axis defined by the pairs of openings, 83, 85 and 91, 93 are parallel to each other and spaced apart from each other. Additionally, in the configuration shown, the upper plates (and corresponding lower plates) for each of the first frame coupling region and the welding coupling region are vertically spaced apart from each other such that the upper plate of the welding coupling region is vertically between the plates of the frame coupling region. Of course, other configurations are contemplated.

In the configuration shown in FIGS. 1 through 10, the suspension frame may further include a counterweight coupling region on a side opposite the frame coupling region from the welding coupling region. In such a configuration, counterweights 74 may be suspended or coupled to the suspension frame at the counterweight coupling region 73 so as to cancel and/or counter the weight of the welding assembly and the welding process that is borne by the welding coupling region. In some configurations such as the configuration of FIGS. 11 through 14, such a counterweight coupling region may be omitted, and instead, the frame axle manages the bending moment created by the off-center loading on the welding coupling region.

Figure 13:
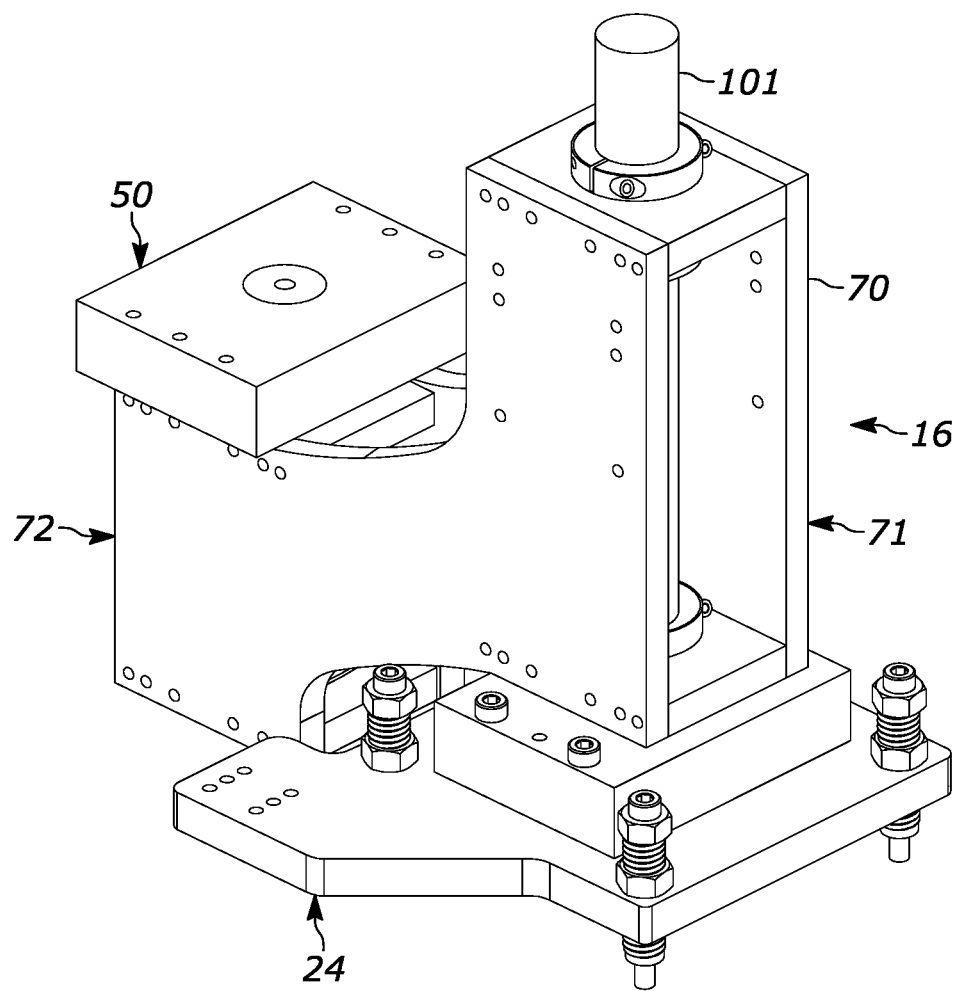
FIG. 13 of the drawings is a perspective view of the coupling assembly of the fastener welding apparatus of the present disclosure, having a configuration that omits the counterweight coupling region as well as counterweights.
Figure 14:
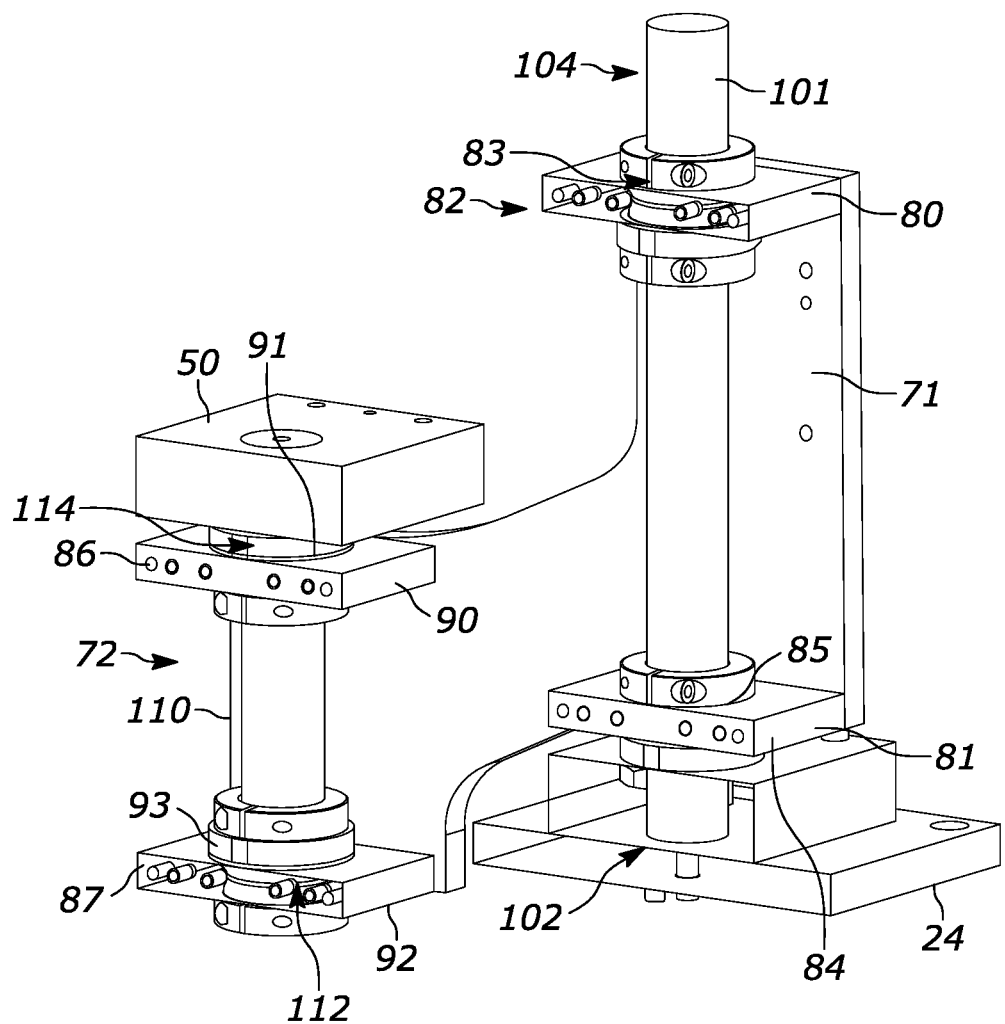
FIG. 14 of the drawings is a perspective view of the coupling assembly of the fastener welding apparatus of the present disclosure, having a configuration that omits the counterweight coupling region as well as counterweights.

Referring again to FIGS. 6 through 9, and in particular to FIG. 8, the frame axle 101 includes first end 102 and second end 104 (similar reference can be made to FIGS. 13 and 14 for the second configuration shown). The first end 102 of the frame axle 101 is coupled to the platform 24 of the lower base portion 20. In the configuration shown, the base portion 20 has an opening that is sized to receive the first end of the frame axle, and, a fastener couples the frame axle 101 to the frame assembly. In the configuration shown, the frame axle 101 is fixedly engaged with the platform of the lower base portion. The frame axle 101 extends through both the opening 83 and the opening 85 of the frame coupling region 71, and is rotatably positioned therewith through the use of bearings. The bearings allow for smooth and relatively unobstructed pivoting of the suspension frame about the frame axle 101.

Similarly, the welding axle 110 includes first end 112 and second end 114. The second end 114 is coupled to the lower cross plate 50 of the lower extension 44 of the welder frame 40. In the configuration shown, second end 114 extends through an opening in the lower cross plate and coupled thereto with the use of suitable fasteners. The welding axle is configured to extend through the opening 91 and the opening 93 of the welding coupling region 72, and is rotatably positioned therewith through the use of bearings. As with the frame axle, the bearings allow for a smooth and relatively unobstructed pivoting of the suspension frame about the welding axle 110.

In the configuration shown, the amount of pivoting about the frame axle 101 and the welding axle 110 is determined by the locating assembly and the relative configuration of the components thereof, which allow for centering and also which allow for movement within a predetermined limitation. In other configurations, it is contemplated that the pivoting of the suspension frame about the frame axle and about the welding axle can be limited through limiters or interference structures located on one or more of the axles, the suspension frame and/or the frame assembly.

As the frame axle 101 and the welding axle 110 are parallel to each other, the combined pivoting of the suspension frame relative to each of the frame assembly and the welding assembly allows for translation of the electrodes through a desired range of movement. By utilizing relatively large axles as well as a suspension frame that is both balanced and generally symmetrical through the spaced apart plates, improved movement of the welding assembly in predictable and desirable manners can be achieved. Additionally, undesirable distortion or bending can be minimized or eliminated.

Figure 9:
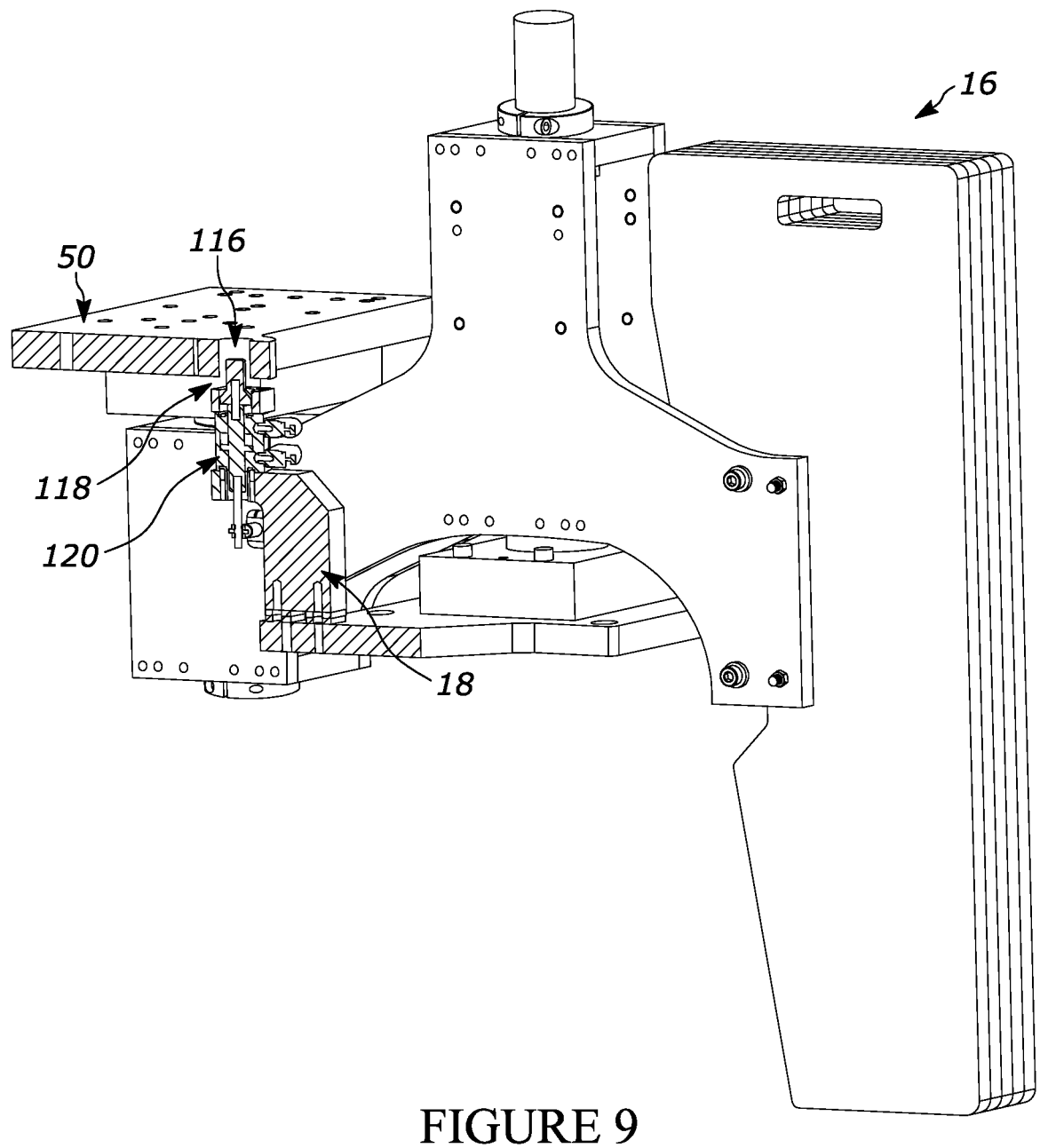
FIG. 9 of the drawings is a cross-sectional view of the locating assembly of the fastener welding apparatus of the present disclosure.
Figure 10:
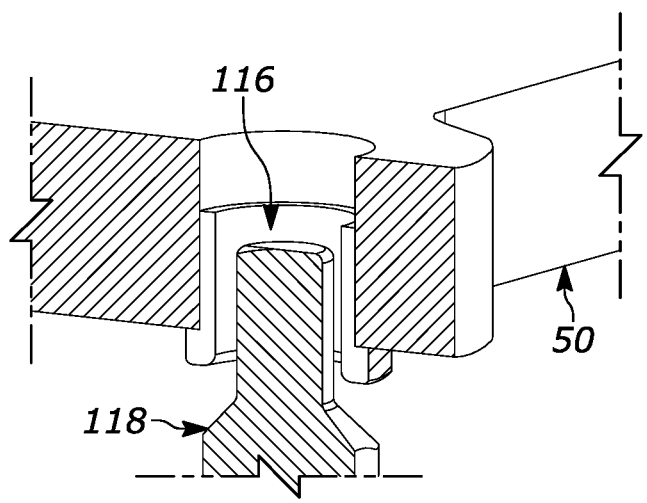
FIG. 10 of the drawings is a partial cross-sectional view of the first and second mating structures of the locating assembly of the fastener welding apparatus of the present disclosure, and the interaction between the first and second mating structures.

The locating assembly 18 is shown generally in FIG. 1, and in greater detail in FIGS. 9 and 10, as comprising a first mating structure 116, a second mating structure 118 and an actuator 120. In the configuration shown, the first mating structure 116 comprises a generally circular opening that is fixed to the welder frame 40 proximate the lower cross plate 50.

The second mating structure 118 comprises a pin member having a frustoconical configuration, wherein the upper portion has a diameter that is smaller than the opening defining the first mating structure 116 and the lower portion has a diameter that substantially matches the diameter of the first mating structure.

The second mating structure is coupled to an actuator that is mounted to the frame assembly 12. The actuator facilitates movement of the second mating structure relative to the first mating structure between a first position and a second position. In the first position, the lower portion of the second mating structure engages the first mating structure and the two are engaged such that relative translative movement therebetween is precluded. In the second position, the upper portion of the second mating structure remains engageable with the first mating structure. As the upper portion is smaller than the opening of the first mating structure, relative movement between the first mating structure and the second mating structure is permitted. When returned to the first position, the conical outer surface of the second mating structure hits the first mating structure and moves the second mating structure until the two are in alignment so that the second mating structure can be fully inserted into the first mating structure, thereby precluding relative movement therebetween. As the configurations are circular, the first configuration returns or re-centers the welding head to an orientation that is generally in the center of the range of movement.

It will be understood that the relative size difference between the two mating structures defines the range of movement therebetween. Additionally, as the first mating structure is translationally fixed (in the horizontal direction) to the welder frame and the second mating structure is translationally fixed (again in the horizontal direction) to the frame assembly, the amount of relative movement between the two structures (as defined by the pivoting of the suspension frame about the frame axle and the welding axle) is defined by the difference in the size and position of the first mating structure and the second mating structure. In some configurations, the size of the first mating structure and the size and configuration of the upper end of the second mating structure define the limits of the movement of the electrodes and the pivoting of the suspension frame about the frame axle and the welding arm. Without this interaction, the pivoting of the suspension frame could be limited only by interference with the frame assembly and the welding assembly.

For example, a number of different first mating structures and second mating structures can be provided (or second mating structures that have multiple different upper end diameters) so as to alter the amount of movement of the welder frame (and therefore electrodes) relative to the frame assembly. It will further be understood that in other configurations, the actuator may be associated with the first mating structure, instead of the second mating structure. In other configurations, multiple actuators may be utilized to, for example, achieve different movements and different ranges of movement. Furthermore, it will be understood that, while a circular configuration (i.e., cylindrical) is shown for the first mating structure, and a frustoconical configuration is shown for the second mating structure, the two structures may have different shapes, and cross-sectional configurations, such as square, triangular, polygonal and the like, as well as arbitrary shapes to achieve different movements, patterns of movement and ranges of movement. Essentially, the locating assembly allows for an engagement range (or, otherwise termed, a range of acceptable relative positioning), and a centering position, wherein the assembly is locked in a generally central position within the range of motion.

In operation, a part is delivered to the fastener welding apparatus by a robot arm (not shown). It will be understood that the actual position of the part may be within an acceptable range of positions, however, there is generally not an exact position of the part. It is the fastener welding apparatus that adjusts for the different and variable placement of the part by the robot arm.

At or about the same time (i.e., prior, during or just after), the fastener is provided to the fastener welding apparatus. Generally, the fastener is retained by the fastener positioning assembly. Once the fastener and the part are present in the fastener welding apparatus, the electrode reference assembly 66 can determine if the part is within the acceptable range of positions and orientations to proceed with the welding process. In many instances, the electrode reference assembly comprises a conical member that terminates in a point, the electrode reference assembly can determine if the feature of the part which forms the reference (i.e., in many instances, an opening) is within the proper range for the process to proceed.

Initially, the locating assembly starts in the first position, wherein the first mating structure fully engaging the second mating structure so that the welding assembly is generally precluded from translating relative to the frame assembly. Once it is determined that the part is within the proper range of positions for the welding process, the actuator 120 is activated and the second mating structure moves relative to the first mating structure which, in turn, separates two structures from each other. At such time, the first and second mating structures allow for relative movement of the welding assembly and the frame assembly. In more detail, the separation of the outer surfaces of the first and second mating structures allow for the pivoting of the suspension frame relative to the frame axle 101 and the welding axle 110. This allows for the welding frame (and, in particular, the upper and lower electrodes) to move relative to the stationary part.

As the electrodes are moved toward each other, the electrodes sandwich the fastener and the part. The electrode reference assembly engages the part and this engagement urges the welder frame into the correct position to execute the weld at precisely the correct location. The configuration and the structure of the coupling assembly allows for relatively small forces to facilitate movement and orientation of the relatively heavy welding assembly, and to guide the electrodes into the proper orientation relative to the part.

Once welded, the electrodes are separated, and the part is removed. At or near the same time, the actuator 120 of the locating assembly is actuated again to return the second mating structure into engagement with the first mating structure, or, into the first position. The welding apparatus is now ready to repeat a welding cycle.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A fastener welding apparatus comprising:
    a frame assembly;
    a welding assembly having a welder frame and a welding electrode assembly coupled to the welder frame;
    a coupling assembly having a suspension frame, a frame axle and a welding axle, the frame axle is fixedly engaged to the frame assembly and the welding axle is fixedly engaged to the welding assembly, with the suspension frame pivotably coupled to each of the frame axle and the welding axle; and
    a locating assembly structurally configured to selectively allow the suspension frame to pivot relative to the frame axle and the welding axle.

2. The fastener welding apparatus of claim 1, wherein the welding electrode assembly comprises an upper electrode and a lower electrode, defining an electrode axis, and wherein the frame axle and the welding axle are parallel to each other and parallel to the electrode axis.

3. The fastener welding apparatus of claim 2 wherein the electrode axis is spaced apart from the welding axle.

4. The fastener welding apparatus of claim 1 wherein the suspension frame includes a frame coupling region and a welding coupling region spaced apart from the frame coupling region, with the frame axle being positioned proximate the frame coupling region and the welding axle positioned proximate the welding coupling region.

5. The fastener welding apparatus of claim 4 wherein the suspension frame further includes a counterweight coupling region on a side opposite the welding coupling region with the frame coupling region being positioned therebetween.

6. The fastener welding apparatus of claim 5 further comprising at least one counterweight attached to the suspension frame proximate the counterweight coupling region.

7. The fastener welding apparatus of claim 1 wherein the locating assembly further comprises a first mating structure coupled to the welder frame and a second mating structure coupled to the frame assembly, with an actuator coupled to one of the first mating structure and the second mating structure, the actuator configured to direct the mating structures between a first position and a second position, wherein, in the first position, relative movement of the welding frame relative to the frame assembly about is precluded.

8. The fastener welding apparatus of claim 7 wherein in the second position, relative movement of the welding frame relative to the frame assembly through the coupling assembly is facilitated.

9. The fastener welding apparatus of claim 8 wherein in the second position, the locating assembly defines a range of movement of the welding frame relative to the frame assembly.

10. The fastener apparatus of claim 7 wherein the first mating structure comprises a generally circular opening that is fixed to the welder frame, and the second mating structure comprises a pin member.

11. The fastener apparatus of claim 10 wherein the pin member has a frustoconical configuration, wherein an upper portion of the pin member has a diameter that is smaller than the opening defining the first mating structure and a lower portion of the pin member has a diameter that substantially matches the diameter of the first mating structure.

12. The fastener apparatus of claim 7 wherein the actuator is coupled to the second mating structure.

13. The fastener apparatus of claim 1 wherein the welding frame is coupled to an upper end of the welding axle and fixed thereto.

14. The fastener apparatus of 13 wherein the welding frame further includes a lower cross plate coupled to the welding axle, and a pair of spaced apart c-shaped side surfaces coupled to the welding frame, the side surfaces defining a lower extension and an upper extension, with an upper electrode coupled to the upper extension and a lower electrode coupled to the lower extension.

15. A method for welding a fastener comprising:
directing a part into a welding apparatus;
directing a fastener into a welding apparatus;
coupling a welding electrode assembly to a frame assembly through a coupling assembly, with the coupling assembly allowing for selective movement of the welding electrode assembly relative to the frame assembly;
allowing the coupling assembly to move relative to the welding electrode assembly;
moving the welding electrode assembly into the desired orientation relative to the part;
welding the fastener to the part;
removing the part; and
precluding the coupling assembly to move relative to the welding electrode assembly.

16. The method of claim 15 wherein the coupling assembly has a suspension frame, a frame axle and a welding axle, the frame axle is fixedly engaged to the frame assembly and the welding axle is fixedly engaged to the welding assembly, with the suspension frame pivotably coupled to each of the frame axle and the welding axle.

* * * * *